United States Patent [19]

Church et al.

[11] Patent Number: 5,970,484
[45] Date of Patent: Oct. 19, 1999

[54] METHOD FOR RETRIEVING TEXTS WHICH ARE SIMILAR TO A SAMPLE TEXT

[75] Inventors: Kenneth Ward Church, Chatham; Jonathan Isaac Helfman, Gillette; David Dolan Lewis, Summit, all of N.J.

[73] Assignee: Lucent Technologies, Inc., Murray Hill, N.J.

[21] Appl. No.: 08/654,044

[22] Filed: May 28, 1996

Related U.S. Application Data

[63] Continuation of application No. 08/188,002, Jan. 28, 1994, abandoned, which is a continuation-in-part of application No. 08/151,079, Nov. 12, 1993, abandoned.

[51] Int. Cl.⁶ .................................................. G06F 17/30
[52] U.S. Cl. .................................................. 707/4
[58] Field of Search ........................ 707/1, 4, 5

[56] References Cited

U.S. PATENT DOCUMENTS

| | | | |
|---|---|---|---|
| 4,823,306 | 4/1989 | Barbic et al. | 395/600 |
| 4,893,333 | 1/1990 | Baran et al. | 379/100 |
| 5,010,500 | 4/1991 | Makkuni et al. | 345/358 |
| 5,020,019 | 5/1991 | Ogawa | 395/600 |
| 5,109,439 | 4/1992 | Froessl | 382/305 |
| 5,153,744 | 10/1992 | Nobuta | 358/400 |
| 5,220,622 | 6/1993 | Scarr | 382/210 |
| 5,251,268 | 10/1993 | Colley et al. | 382/156 |
| 5,341,222 | 8/1994 | Newman et al. | 358/403 |
| 5,404,435 | 4/1995 | Rosenbaum | 707/515 |
| 5,422,821 | 6/1995 | Allen et al. | 364/478 |

FOREIGN PATENT DOCUMENTS 0 435 316   7/1991   Japan .............................. G06F 15/40

OTHER PUBLICATIONS

Al–Hawamdeh et al. "Compound Document Processing System", Proc. of the Fifteenth Annual Internat. Computer Software and Applications Conf., IEEE Computer Soc. Press, pp. 640–644, Sep. 1991.

"Rough Sketch–Based Image Information Retrieval" by Kyoji Hirata and Toshikazu Kato, NEC Research and Development, vol. 34, No. 2, Apr. 1993, pp. 263–273.

"Relevance Feedback and Other Query Modification Techniques" and "Ranking Algorithms" edited by William B. Frakes and Ricardo Baeza–Yates, from Information Retrieval Data Structures & Algorithms, pp. 241–263 and 363–392, Prentice Hall, 1992.

Harman, D. "Relevance Feedback and Other Query Modification Techniques" and "Ranking Algorithms", *Information Retrieval Data Structures & Algorithms*, pp. 241–263 and 363–392, edited by W. B. Frakes & R. Baeza–Yates, Prentice Hall, 1992.

*Primary Examiner*—Jack M. Choules

[57] ABSTRACT

An information retrieval method wherein users may submit a query via a graphical bitmapping technique. The user provides an information retrieval system with a bitmap of a printed, written, or graphical query by either scanning the query with a graphical scanner, or employing a standard facsimile transmission machine. The information retrieval system then performs an optical image/character recognition process upon the received bitmap to determine the content of the query, information is then retried based upon the recognized characters and images. In a particular method of the invention, the user is provided with a bitmap of the retrieved information.

14 Claims, 2 Drawing Sheets

FIG. 3

Retrieval of information from electronic databases in response to a specific query is well known. Typically, a user will access an information retrieval system associated with a particular database, and enter the query via a keyboard. Depending upon the specific information retrieval system, this query could be a phrase, a narrative description, a list of keywords, or some other form of character string describing the information to be retrieved. information retrieval system returns to the user

METHOD FOR RETRIEVING TEXTS WHICH ARE SIMILAR TO A SAMPLE TEXT

CROSS-REFERENCE TO RELATED APPLICATION

This is a Continuation of Application Ser. No. 08/188,002 filed Jan. 28, 1994, now abandoned which was a Continuation in part of application Ser. No. 08/151,079 field Nov. 12, 1993 now abandoned.

TECHNICAL FIELD

The invention relates to information retrieval, and in particular, to the retrieval of electronically stored information in response to a query.

BACKGROUND OF THE INVENTION

Retrieval of information from electronic databases in response to a specific query is well known. Typically, a user will access an information retrieval system associated with a particular database, and enter the query via a keyboard. Depending upon the specific information retrieval system, this query could include a phrase, a narrative description, a list of keywords, or some other form of character string describing the information to be retrieved. In response to the query, the information retrieval system returns to the user an electronic version of the information contained within the database that conforms to the query. The information returned can be text, graphics, or a combination of the two.

One drawback of current information retrieval systems is the requirement that a user draft a query, and provide it to the system via a keyboard. For example, if a user has a printed page of text related to a particular subject the user wishes to retrieve information on (i.e., an abstract dealing with the subject of interest, or a written list of keywords), the user must provide that text (or at least some subset of that text) to the information retrieval system by typing characters upon a keyboard. Based upon these entered characters, the information retrieval system performs a search of a database and retrieves the appropriate information.

SUMMARY OF THE INVENTION

The aforementioned problems are solved, in accordance with the principles of the invention, by an information retrieval method wherein users submit a query via a graphical bitmapping technique. The user provides an information retrieval system with a bitmap of a printed, written, or graphical query by either scanning the query with a graphical scanner, or employing a standard facsimile transmission machine. The information retrieval system then performs an optical image/character recognition process upon the received bitmap to determine the content of the query, information is then retrieved based upon the recognized characters and images. In a particular method of the invention, the user is provided with a bitmap of the retrieved information (be it textual or graphical in nature).

BRIEF DESCRIPTION OF THE DRAWING

In the drawing:

FIG. 3 shows an example of a bitmap image viewed upon monitor 206 of FIG. 2.

DETAILED DESCRIPTION OF THE INVENTION

Figure 1:
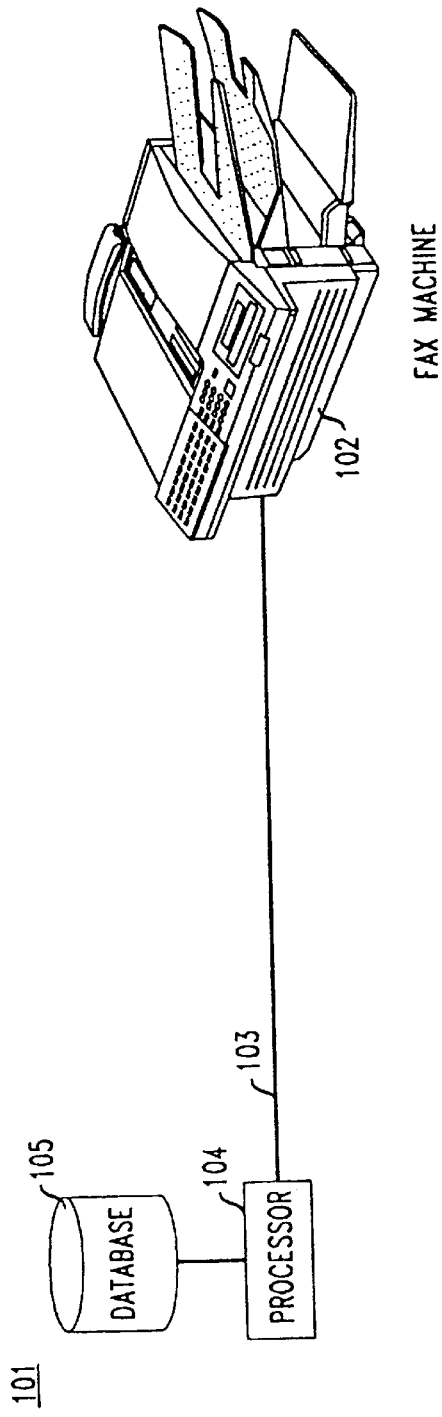
FIG. 1 shows, in simplified block diagram form, an information retrieval system including a facsimile transmission and reception apparatus, which facilitates the practice of a particular method of the invention.

FIG. 1 is a simplified block diagram showing an information retrieval system facilitating the practice of a particular method of this invention. As shown, service node 101 and facsimile transmission and reception machine ("fax machine") 102 are interconnected via switched telecommunication network 103. Service node 101 includes processor 104 and electronic database 105. Processor 104 is adapted to retrieve character based information (i.e., text stored as ASCII codes) and/or graphical information (text or pictures stored as bitmaps) from within electronic database 105 in response to bitmap information received via switched telecommunication network 103. The functionality of processor 104 can be implemented upon any relatively robust computing platform, such as a Sparc workstation, manufactured by SUN Microsystems, Milpitas, Calif. Fax machine 102 may be any standard facsimile transmission device adapted to scan an image and transmit a bitmap of that image via a telecommunication line. One such device is the Fax 9020FX manufactured by AT&T. Switched telecommunication network 103 can be any telecommunication link suitable for the transmission of facsimile information. This includes local, long-distance, and or private telephone and data networks.

In practicing the invention within the system of FIG. 1, a user establishes a connection between fax machine 102 and service node 101 by dialing a telephone number associated with service node 101. The user then requests the retrieval of certain information from within database 105 by employing fax machine 102 to scan a written or printed representation of an information request. Fax machine 102 generates and transmits a bitmap of the scanned representation to processor 102 within service node 101. The particular format of this request representation is dictated by the capabilities of processor 104 and fax machine 102. For example, the representation of the user's information request must be provided in a format having sufficient resolution and contrast to allow fax machine 102 to produce a recognizable bitmap upon scanning the request. The representation of the request must also be provided in a format compatible with the programming of processor 104. It is well-known in the art that a text-based information may be searched for on the basis of a series of keywords related to particular information, the tide of a specific piece of information, the database address of a specific piece of information, as well as a narrative or sample document related to the requested information. In the case of a search based upon a narrative or sample document, the particular search parameters may be arrived at by applying term weighting techniques to the text (such as those disclosed by Gerard Salton in Automatic Text Processing: The Transformation, Analysis, and Retrieval of Information by Computer, Addison-Wesley Publishing, 1989; or by Donna Harman in Information Retrieval Data Structures & Algorithms, Prentice-Hall Publishing, 1992). In addition, pattern matching techniques may be employed to search a graphical database, although such techniques are presendy limited to recognizing relatively simple patterns and shapes. In this particular information retrieval system, processor 104 is adapted to recognize machine printed or handwritten text characters within a received bitmap, reconstitute the full text of the scanned representation, and perform a search based upon term weighting techniques.

When making an information retrieval request, the user must be identified to the information retrieval system. This allows any retrieved information to be transmitted to the proper user, and facilitates billing (if the user is to be charged for the requested search). Identification can be effected by providing processor 104 with the user's telephone number via an automatic number identification system (if such is available within switched telecommunication network 103), or by identifying information included along with the representation of the information request scanned into fax machine 102 by the user.

Once the user has been properly identified, processor 104 performs a term weighting analysis upon the text reconstituted from the received bitmap to formulate appropriate search parameters, and then executes a search of database 105 based upon these parameters. Information conforming to the search defined by these particular parameters is then retrieved from database 105 and transmitted, in bitmap form, from processor 104 to fax machine 102. As a result, the user who had initiated the search is provided with a hard copy of the retrieved information.

Figure 2:
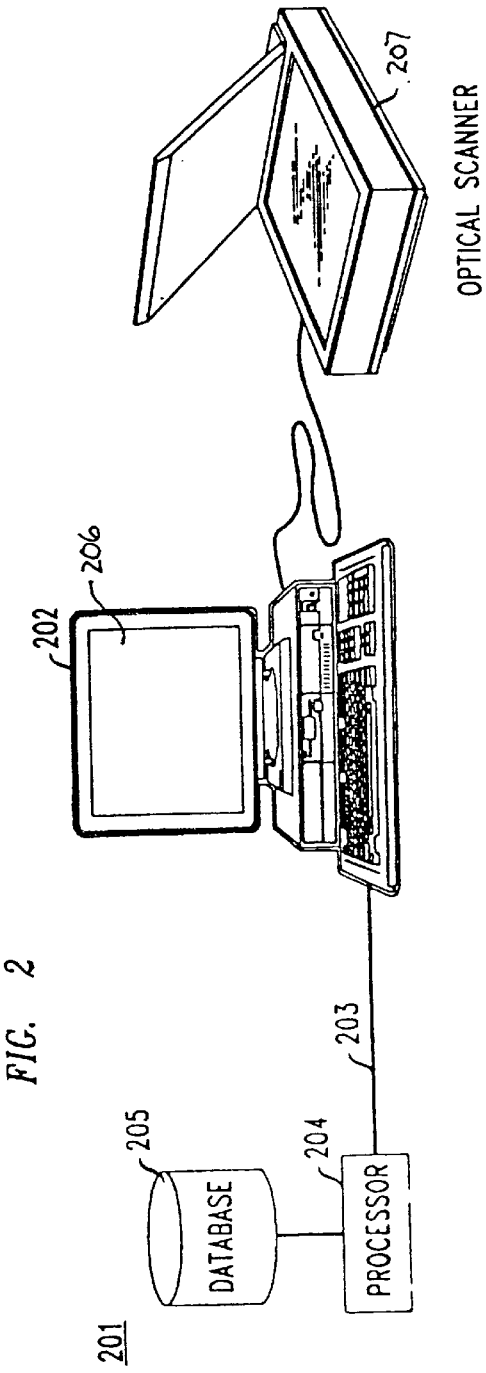
FIG. 2 shows, in simplified block diagram form, an information retrieval system including an optical scanner, which facilitates the practice of an alternate method of the invention.

FIG. 2 is a simplified block diagram of an information retrieval system including an optical scanner, which facilitates an alternate method of practicing the invention. As shown, service node 201 and computer 202 are interconnected via switched telecommunication network 203. Service node 201 includes processor 204 and electronic database 205, which are similar in configuration and operation to the processor and database depicted in FIG. 1. Likewise, switched telecommunication network 203 is similar to switched telecommunication network 103 of FIG. 1. Computer 202, which is linked to monitor 206 and optical scanner 207, may be any general purpose machine, such as an IBM-compatible personal computer based upon an 80386 or 80486 microprocessor. Optical scanner 207 can be any commercially available scanner adapted to scan and digitize graphical or textual information into a representative bitmap. One such optical scanner is the 9195A ScanJet Plus, manufactured by Hewlett-Packard Corporation, Palo Alto, Calif.

In practicing the invention within the system of FIG. 2, a user establishes a connection between computer 202 and service node 201 by dialing a telephone number associated with service node 201. The user then requests the retrieval of certain information from within database 205 by placing a written or printed representation of the desired request upon optical scanner 207. The representation is scanned and digitized into a bitmap by optical scanner 207, and this bitmap is transmitted to computer 202. Computer 202 transmits the received bitmap to service node 201 via switched telecommunication network 203. As in the previously described embodiment, the user is identified to the information retrieval system either by automatic number identification, or by identifying information included along with the representation of the information request scanned into optical scanner 207.

The received bitmap is processed, a search performed, and information retrieved in a manner similar to that described for service node 101 of FIG. 1. However, depending upon the programming of processor 204, and/or a particular request made by the user who initiated the search, the retrieved information may be transmitted to computer 202 in two distinct formats—bitmap and character string. If processor 204 transmits a bitmap of the retrieved information, computer 202 is provided with a full image of the retrieved information (including graphics), that can be viewed upon monitor 206, and manipulated and modified like any other graphic image. If a stream of data representing the text characters (i.e., ASCII characters) contained in the retrieved information is transmitted by processor 204, computer 202 will receive a representation of text which could be easily manipulated by word processing software. Naturally, processor 204 could transmit the retrieved information to computer 202 in both the bitmap and text character formats.

An example of a bitmap image transmitted to computer 202 as the result of a requested search is shown in FIG. 3. As illustrated, the bitmap, which represents the image of a document, is displayed upon monitor 206. A user may employ this received bitmap to initiate yet another search. In doing so, the user selects a portion of the displayed bitmap (up to and including the entirety of the displayed bitmap) that provides the parameters for the desired search. In the particular case illustrated in FIG. 3, the user has highlighted a particular portion of the displayed bitmap (as indicated by the shaded rectangular area visible upon the field of monitor 206). This highlighting could be performed by a user employing any number of well known computer pointing devices (i.e., mouse, joystick, cursor keys). This highlighted portion of the bitmap is then transmitted from computer 202 to service node 201. The received bitmap is processed and a search is performed. The processing of the bitmap in this example would include the recognition of text characters and the derivation of particular search parameters by application of term weighting techniques. The information retrieved by the search is then transmitted back to the requesting user.

In any of the above described methods, the format of search request representation is limited only by the capabilities of the scanning device (be it a fax machine or an optical scanner) and the service node processor. Searches may be performed based upon scanning text, illustrations, photos, or pre-printed forms that have been filled out by the requesting user.

The above-described invention provides a practical and efficient information retrieval technique which allows a user to initiate a search simply by scanning an image. It will be understood that the particular methods described are only illustrative of the principles of the present invention, and that various modifications could be made by those skilled in the art without departing from the scope and spirit of the present invention, which is limited only by the claims that follow. One such modification would include performing a search based upon a bitmap retrieved from a computer memory, as opposed to one originating from a fax machine or optical scanner. Yet another modification would be the practice of the invention within a networked system including multiple users and/or multiple databases.

We claim:

1. A method for using a sample text to locate and retrieve texts similar to the sample text from a database, the method comprising the steps of:

providing an image of the sample text for locating and retrieving texts similar to the sample texts;

applying an optical character recognition process to the image of the sample test after providing the image of the sample text to obtain a sequence of charter codes which represents the sample text;

automatically producing search parameters from the sequence of character codes; and using the search parametes to locate at least one text in the database which is similar to the sample text.

2. The method set forth in claim 1 wherein:

the step of automatically producing search parameters includes the step of applying term weighting techniques to the sequence of character codes.

3. The method set forth in claim 1 further comprising the step of:

provating at least one of the located similar texts to the user.

4. The method set forth in claim 3 wherein:

the located similar text is provided as an image.

5. The method set forth in claim 4 wherein:

the image of the located similar text is provided via a facsimile machine.

6. The method set forth in any of claim 1 through 3 further comprising the steps of:

providing an image of a first text to a display device accessible to the user; and responding to an interactive selection by the user of a portion of the first text by providing the selected portion as the sample text.

7. The method set forth in any of claim 1 through 4 wherein:

the image of the sample text was generated by a facsimile transmission machine.

8. The method set forth in any of claim 1 through 4 wherein:

the image of the sample text was generated by an optical scanner.

9. The method set forth in any of claims 1 through 4 wherein:

the image of the sample text is a designated portion of a larger text.

10. The method set forth in claim 3 further comprising the steps of:

providing an image of a first text to a display device accessible to the user;

responding to an interactive selection by the user of a portion of the first text by providing the selected portion as the sample text; and providing an image of the similar text to the user on the display device.

11. The method set forth in claim 10 wherein:

the steps of the method of claim 10 are repeated with the image of the located similar text as the image of the first text.

12. A method of retrieving information from an electronic database using a query, the query being represented by at least one of printed information, written information and graphical information, the method comprising the steps of:

providing a bitmap of the query;

perform optical image/character recognition upon the bitmap after providing the bitmap of the query to determine content of the query, the content of the query being at least one recognized image; and retrieving the information from the electronic database based upon the at least one recognized image.

13. The method set forth in claim 12, wherein the retrieved information is provided in a form of a retrieved bitmap.

14. The method set forth in claim 13, wherein the retrieved bitmap is graphical.

* * * * *